Dec. 6, 1955   R. I. MATHER   2,725,835
COMPOSITE CARPET AND METHOD OF MAKING SAME
Filed April 27, 1953

INVENTOR.
ROBERT I. MATHER
BY Joshua H. Potts
HIS ATTORNEY.

United States Patent Office 2,725,835
Patented Dec. 6, 1955

2,725,835

COMPOSITE CARPET AND METHOD OF MAKING SAME

Robert I. Mather, Haddonfield, N. J.

Application April 27, 1953, Serial No. 351,309

3 Claims. (Cl. 112—1)

This invention relates to a composite pile carpet with foam rubber backing and the method of making the same.

In the carpet industry, carpeting is made by a variety of methods, some of which are time-consuming, difficult, and costly. The trend of present-day carpet manufacturing is to produce a carpet with improved resiliency, having a built-in cushion effect, eliminating in many instances the necessity of a separate base carpet or mat. This has been done by a variety of methods, including the vulcanization of rubber to adhere to fabric surfaces. Methods of this type require technical skill, costly equipment, and are time-consuming.

It is an object of this invention to provide a composite carpet with enhanced resiliency, and a method of making the same. It is another object of this invention to provide a composite carpet with enhanced resiliency and resistance to wear and slippage, and method of making the same.

These objects are obtained by the particular combination of steps and elements shown in the accompanying drawings describing the preferred embodiment of this invention in which similar numerals refer to similar parts throughout the several views.

Figure 1:
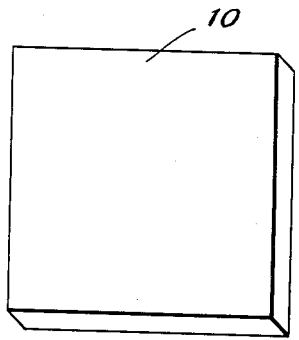
Figure 1 illustrates a representative section of foam rubber used as a starting point in this method.
Figure 2:
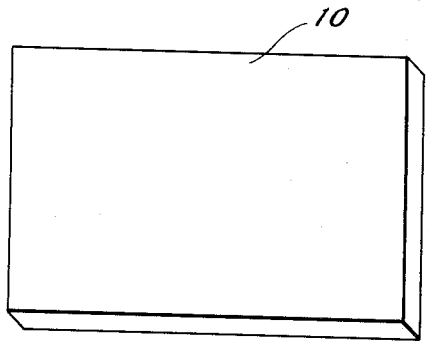
Figure 2 illustrates the same section stretched or elongated.
Figure 3:
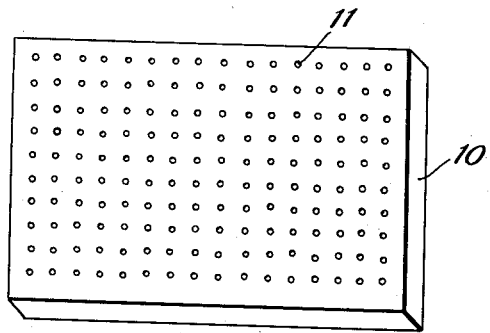
Figure 3 shows the stretched section with perforations therein.
Figure 4:
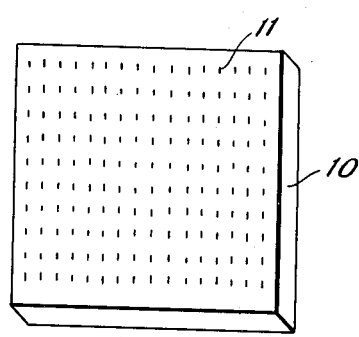
Figure 4 shows the perforated foam section retracted to its normal position.

In making a carpet by the method of this invention, a section of foam rubber 10 of Fig. 1 is taken and stretched to a position generally similar to that depicted in Fig. 2. While it is in this stretched condition, a plurality of perforations 11 are formed in a uniform relation to each other as by punching or other suitable means, as shown in Fig. 3. The foam rubber is then permitted to return to its normal condition, wherein the perforations 11 will be substantially closed having the tendency to grip or hold everything inserted therein.

Figure 5:
Figure 5 is a sectional view of the perforated foam section with fabric applied to both surfaces.
Figure 6:
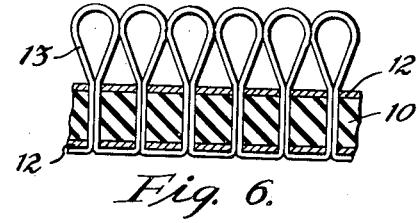
Figure 6 is a sectional view showing how the surface yarn is inserted into the perforations.
Figure 7:
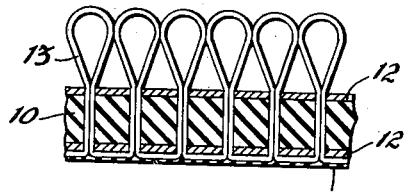
Figure 7 is a sectional view with the yarn inserted into the perforations, showing a layer of latex on the bottom surface.
Figure 8:
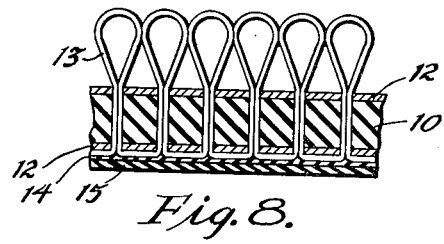
Figure 8 is a sectional view with the yarn inserted into the perforations, showing a combined bottom surface of latex and wear-resistant material.

In the next step, a layer of fabric 12 is applied to both faces of the foam rubber by means of a suitable adhesive, as shown in Fig. 5. A yarn 13 is then applied by using a chenille machine which carries the yarn through the perforations 11, as illustrated in Fig. 6, wherein the strands of yarn assume a substantially U-shaped configuration, with the major portion thereof extending above the top surface of the carpet, and a minor portion extending from the bottom surface thereof. The needles of the chenille machine are synchronized with respect to the location of the holes in the foam rubber base. During this phase of the process the carpet is made bottom-side up, so that the yarn ends shown on the bottom of the carpet in Figures 6, 7, and 8 are facing upwardly. The pressure exerted on the yarn by the walls of perforations 11 produces a locking-action tending to hold the yarn in place.

Next, a layer of latex 14 is applied to the upward-facing bottom surface in a liquid state by spraying or using a roller, covering the bottom layer of fabric 12 and the ends of yarn 13 extending through the perforations 11. This produces a further "locking" action, provides a protective covering for the yarn ends thus exposed, and reduces slippage of the carpet. Finally, a layer of wear-resistant material 15, such as hard rubber or the like, is applied to the bottom latex surface by a suitable adhesive. This layer will resist the wearing action of constant usage and will reduce slippage of the carpet to a minimum. This wear-resistant layer 15 should be formed preferably of a rough surface, having ridges or the like therein to provide a better gripping action in the prevention of slippage. This latter layer may be eliminated, however, without departing from the spirit of the invention.

Although the present description has been limited in this discussion to the use of foam rubber as a base cushion material, other suitable resilient plastics and elastomers such as rubber and synthetic rubber (Buna S, Buna N, chloroprene and Thiokol) in unaerated form, polyvinyl chloride, polyvinyl acetate and polyvinyl chloride-acetate may be used without departing from the spirit of the invention.

It will be evident from the above description that the present invention provides a very simple and efficient method for the manufacture of a carpet with built-in cushioning characteristics. It is of particular importance to note that by this method of perforating the foam rubber in the stretched or elongated position, insertion of the yarn is made easier with a resulting beneficial gripping action. In addition, the use of such technical, costly, and time-consuming techniques, such as vulcanization, have been avoided.

It should be understood that the invention may be embodied in methods which may vary substantially in the steps and materials above-described. It is therefore not intended that the invention be limited to the exact process and materials disclosed, but only to the inventive concept as defined in the appended claims.

What is claimed is:

1. The method of making a composite carpet with resilient backing which comprises stretching a resilient material, perforating said resilient material while in the stretched condition, allowing said material to retract to its normal condition, applying a fabric to both sides of said retracted material by means of an adhesive, and passing yarn through said fabric and perforations, the gripping action of said perforations holding the yarn in place.

2. The method of making a composite carpet with resilient backing which comprises stretching a resilient material, perforating said resilient material while in the stretched condition, allowing said material to retract to its normal condition, applying a fabric to both sides of said retracted material by means of an adhesive, passing yarn through said fabric and perforations such that a major portion thereof penetrates the bottom-most fabric layer and a minor portion thereof extends upwardly of the top fabric layer, and applying a layer of latex to said top fabric layer and yarn ends.

3. The method of making a composite carpet with resilient backing which comprises stretching a resilient material, perforating said resilient material while in the stretched condition, allowing said material to retract to its normal condition, applying a fabric to both sides of said retracted material by means of an adhesive, passing yarn through said fabric and perforations such that a major portion thereof penetrates the bottom-most fabric layer and a minor portion thereof extends upwardly of the top fabric layer, applying a layer of latex to said top fabric layer and yarn ends, and covering said latex layer with a wear-resistant material.

References Cited in the file of this patent

UNITED STATES PATENTS

| | | |
|---|---|---|
| 1,662,470 | Pastor | Mar. 13, 1928 |
| 2,028,872 | Kellog | Jan. 28, 1936 |
| 2,183,257 | Hardie | Dec. 12, 1939 |
| 2,480,004 | Dildilian | Aug. 23, 1949 |
| 2,636,460 | Seiderman | Apr. 28, 1953 |
| 2,648,619 | Alderfer | Aug. 11, 1953 |

FOREIGN PATENTS

| | | |
|---|---|---|
| 639,845 | Great Britain | July 5, 1950 |